(12) United States Patent
Weiss

(10) Patent No.: US 8,406,269 B2
(45) Date of Patent: Mar. 26, 2013

(54) FIELD BUS SYSTEM USING SPREAD SPECTRUM

(75) Inventor: Dominik Weiss, Aerzen (DE)

(73) Assignee: Phoenix Contact GmbH & Co. KG (DE)

( * ) Notice: Subject to any disclaimer, the term of this patent is extended or adjusted under 35 U.S.C. 154(b) by 684 days.

(21) Appl. No.: 12/618,246

(22) Filed: Nov. 13, 2009

(65) Prior Publication Data

US 2010/0124253 A1    May 20, 2010

(30) Foreign Application Priority Data

Nov. 14, 2008   (DE) .......................... 10 2008 057 445

(51) Int. Cl.
*H04B 1/00*    (2006.01)

(52) U.S. Cl. ........ 375/130; 375/146; 375/147; 375/215; 375/327; 375/376

(58) Field of Classification Search .......... 375/130–133, 375/135, 136, 140, 141, 144–147, 215, 219, 375/293, 294, 295, 316, 327, 354, 373, 376
See application file for complete search history.

(56) References Cited

U.S. PATENT DOCUMENTS

| | | | |
|---|---|---|---|
| 5,748,670 | A | 5/1998 | Zastrow |
| 6,687,319 | B1 * | 2/2004 | Perino et al. .................. 375/367 |
| 6,708,239 | B1 | 3/2004 | Ellerbrock et al. |
| 7,010,621 | B2 | 3/2006 | Calkins et al. |
| 8,155,165 | B2 * | 4/2012 | Agoston et al. ............... 375/130 |
| 2002/0009125 | A1 | 1/2002 | Shi |
| 2002/0112070 | A1 | 8/2002 | Ellerbrock et al. |
| 2002/0167963 | A1 | 11/2002 | Joa-Ng |
| 2003/0031196 | A1 * | 2/2003 | Nishimura ................... 370/441 |
| 2003/0091056 | A1 * | 5/2003 | Paul Hulme Walker et al. ............................. 370/419 |
| 2003/0163748 | A1 * | 8/2003 | Calkins et al. ................ 713/500 |
| 2008/0172195 | A1 * | 7/2008 | Nakadaira ....................... 702/72 |
| 2008/0224741 | A1 * | 9/2008 | Nagashima et al. .......... 327/114 |
| 2008/0225344 | A1 * | 9/2008 | Okamoto ....................... 358/409 |
| 2009/0141774 | A1 * | 6/2009 | Araki et al. .................... 375/130 |

FOREIGN PATENT DOCUMENTS

| | | |
|---|---|---|
| EP | 1 037 394 A1 | 9/2000 |
| EP | 1933494 A1 | 6/2008 |
| WO | 03/069813 A1 | 8/2003 |
| WO | 2005103851 A1 | 11/2005 |

OTHER PUBLICATIONS

Robert Wolters, "European Office Action for International Application No. 09013156.6-2415", Mar. 26, 2010, Publisher: European Patent Offcie, Published in: EP.

(Continued)

*Primary Examiner* — Hirdepal Singh
(74) *Attorney, Agent, or Firm* — Kaplan Breyer Schwarz & Ottesen, LLP

(57) ABSTRACT

The invention describes a field bus system, in particular a field bus system (10), comprising at least one clocked transmitter (16) and one clocked receiver (17) for transmitting data signals to another field bus device (30) or for receiving data signals from the other field bus device (30). To allow interfering emissions to be reduced, a spread spectrum clock (40) is provided which supplies a local spread spectrum clock signal (SST1). The spread spectrum clock signal is sent to the transmitter (16) and the receiver (17) to allow data signals (DO1, DI1) to be transmitted and received synchronously with the local spread spectrum clock signal.

10 Claims, 2 Drawing Sheets

OTHER PUBLICATIONS

Hui Xiao et al., "Application of Spread Spectrum Communication in Medium Voltage Power Line Carrier", 2005 IEEE/PES Transmission and Distribution Conference & Exhibition: Asia and Pacific, Dalian, China.

"Cypress SM560 Spread Spectrum Clock Generator", Cypress Semiconductor Corporation, Milpitas, California, pp. 1-10, Document#: 38-07020, May 4, 2001.

"Intellon SSC P485 Hardware Design Reference", Intellon Corporation, 2009, Revision 4—Jun. 2008.

"Intellon TEchnical Data Sheet—SSC P485 PL Transceiver IC", Intellon Corporation, 2008, Revision 8—Feb. 2002.

Keith B. Harding et al., "Spread Spectrum Clock Generation for the Reduction of Radiated Emissions", 1994/IEEE, pp. 227-231.

\* cited by examiner

FIELD BUS SYSTEM USING SPREAD SPECTRUM

FIELD OF INVENTION

The invention relates to a field bus system comprising a plurality of users, each having at least one transmitter and one receiver which respectively operate using spread spectrum clock signals. The invention further relates to a field bus device for use in such a field bus system.

BACKGROUND OF THE INVENTION

In field bus systems heretofore, conventional clock sources are used for the clock supply for data transmission. For field bus systems having rapid binary data transmission it is difficult to maintain the tolerance limits for interfering electromagnetic radiation. Avoidance of analog signal forms requires expensive parts in the field bus system. Interfering radiation is reduced by the use of spread spectrum technology, which is based on varying the frequency of a signal and thus obtaining a data or clock signal with a varying bit length.

The use of spread spectrum clock signals in field bus devices is known from U.S. Pat. No. 7,010,621 B2 for at least partially limiting emissions of interfering electromagnetic radiation originating from a local oscillator. However, the linkage of adjacent field bus devices by returning spread spectrum clock signals to the local field bus device is not provided.

A network controller is known from U.S. 2002/0112070 A1 which directs messages between a plurality of remote users of a field bus. The bit rate of the messages may be modified by the network controller without using clock signals.

SUMMARY OF THE INVENTION

An object of the present invention is to provide a field bus system and a field bus device which are designed for rapid binary data transmission while avoiding the fairly intense interfering emissions expected for such an application.

According to the invention, a field bus system having a plurality of users is provided, each having least one clocked transmitter and one clocked receiver for transmitting data signals to a first adjacent user or for receiving data signals from the first user. In addition, a spread spectrum clock is assigned to each user for providing a user-specific spread spectrum clock signal which is sent to the transmitter and the receiver to allow data signals to be transmitted and received synchronously with this spread spectrum clock signal.

A core concept of the invention is to assign a user-specific spread spectrum clock signal to each user, also referred to as a field bus device, in the field bus system for transmitting data signals and clock signals, using spread spectrum technology, to an adjacent user in the field bus system, the adjacent user using the received spread spectrum clock signal for returning signals to the transmitting user.

It is practical to transmit the user-specific spread spectrum clock signal to the respective first adjacent user via a separate clock line or by means of the transmitted data signal.

By using information about the particular user-specific spread spectrum clock signal it is possible to recover received, spectrally modified data signals in the receiver of the particular user. When the user-specific spread spectrum clock signal is transmitted together with the spectrally modified data signal, this clock signal in the receiver of the particular user is available, and may be used for data decoding when the transmitted data of the adjacent user are received.

To enable a bidirectional clocked data transmission, at least one of the users has an additional clocked transmitter and an additional clocked receiver for transmitting data signals to a second adjacent user and for receiving data signals from the second adjacent user, the user-specific spread spectrum clock signal of the second user being sent to the additional transmitter and the additional receiver.

To allow the specific spread spectrum clock signal of the second adjacent user to be received via a separate clock line, the at least one user has a correspondingly designed interface.

If the specific spread spectrum clock signal of the second adjacent user is transmitted by means of the transmitted data signal, not via a separate clock line, the at least one user has a clock recovery circuit for recovering the user-specific spread spectrum clock signal from the data signal coming from the second user.

This organization in the field bus system enables only one specific spread spectrum clock signal to be provided for each user, thereby greatly reducing the technical complexity.

To allow data that is to be transmitted to be suitably coded, and coded received signals to be decoded, the transmitters each have one coder, and the receivers each have one decoder.

At this point it is noted that the spread spectrum clock may provide a spread spectrum clock signal whose frequency varies within a spread period, so that the frequency of the data signal that is to be transmitted changes in accordance with the particular user-specific spread spectrum clock signal.

To enable the data signal to be coded or decoded in a phase-stable manner, the spectrally modified data signal must be scanned at the correct time. To this end, each user may have at least one phase control circuit, in particular a phase-locked loop circuit, which compares the phase position of the data signals to be transmitted and received with the phase position of the respective spread spectrum clock signal.

It is practical for each user to have a programmable control device and/or a data processing unit.

Accordingly, a field bus device having at least one clocked transmitter and one clocked receiver is provided for transmitting data signals to another field bus device or for receiving data signals from the other field bus device. The field bus device also has a spread spectrum clock for providing a user-specific spread spectrum clock signal which is sent to the transmitter and the receiver to allow data signals to be transmitted and received synchronously with the user-specific spread spectrum clock signal.

BRIEF DESCRIPTION OF THE DRAWINGS

The invention is described in greater detail with reference to one exemplary embodiment. The figures show the following.

DETAILED DESCRIPTION

Figure 1:
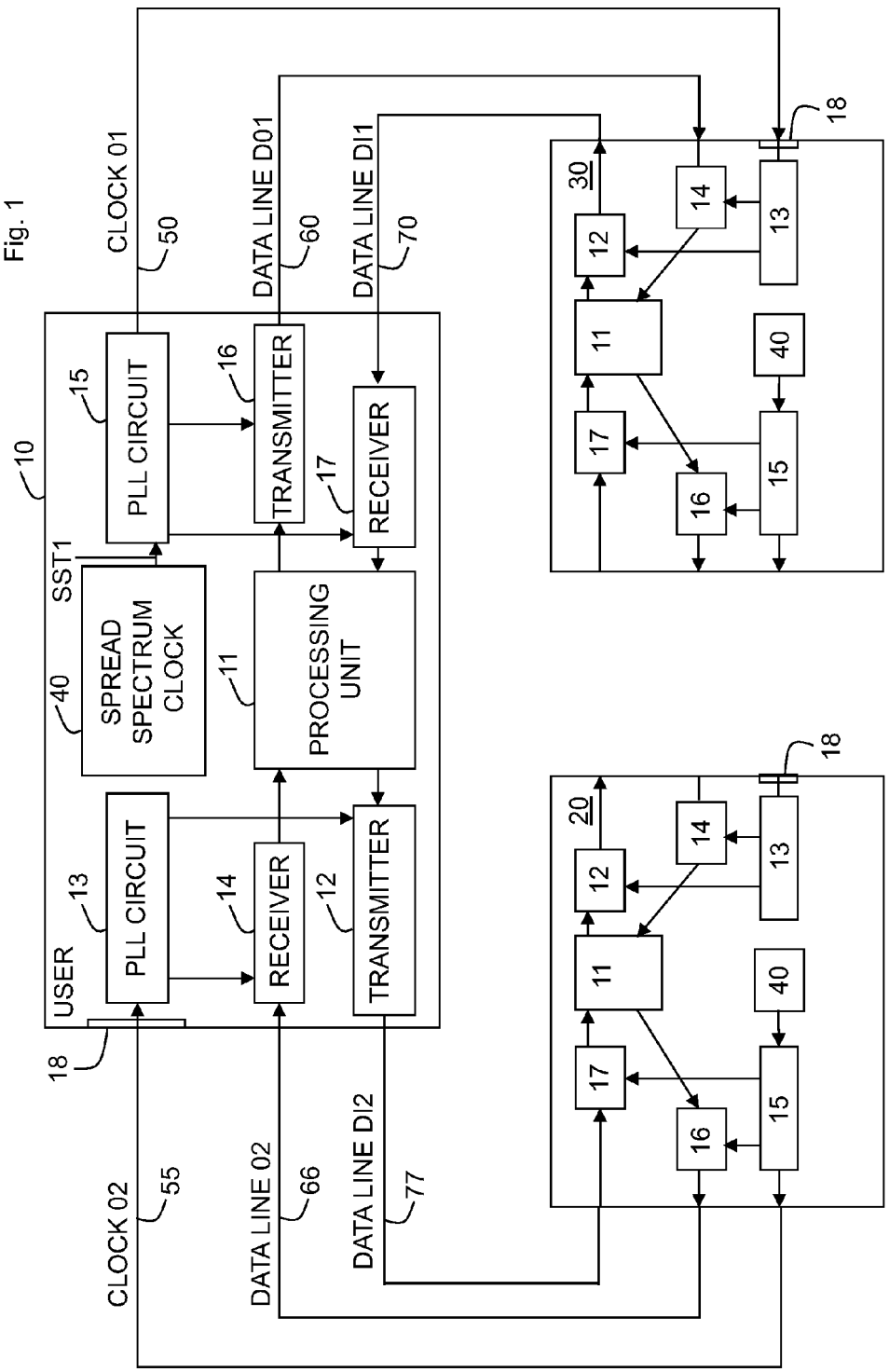
FIG. 1 shows a block diagram of a field bus system in the region of a user.

FIG. 1 shows by way of example a section of a ring-shaped field bus system, having a user 10 and two users 20 and 30 adjacent thereto which are connected via a field bus. Of course, the field bus system may also have more than three users. In the illustrated example the field bus comprises one clock line 50, 55 each in addition to data lines 60, 66 and 70, 77 for bidirectional data transmission between users 10, 20, and 30. The users are also referred to as field bus devices. At least user 10, situated between users 20 and 30, has an incoming interface and an outgoing interface. The incoming interface contains an interface 18, a receiver 14 which may have a decoder, and a transmitter 12 which may have a coder. A spread spectrum clock signal, which is locally provided in user 20 and therefore is referred to as user-specific, arrives at interface 18. The data DO2 which are sent by user 20 in rhythm with the specific spread spectrum clock signal thereof are transmitted to the receiver 14 via data line 66 and decoded. For this purpose the spread spectrum clock signal of the receiver 14 received at interface 18 is preferably supplied via a PLL circuit 13. Data DI2 intended for user 20 are transmitted by the transmitter, synchronously with the specific spread spectrum clock signal of user 20, via data line 77 to user 20. For this purpose the spread spectrum clock signal received at interface 18 is supplied to the coder for the transmitter 12, preferably via the PLL circuit 13.

The outgoing interface of user 10 has a transmitter 16 and a receiver 17. The transmitter 16 preferably has a coder, whereas the receiver 17 preferably has a corresponding decoder. The user 10 also has a spread spectrum clock 40 which provides a spread spectrum clock signal SST1, which is specific for the local user 10, for the outgoing interface. The (local) spread spectrum clock signal provided by the spread spectrum clock 40 is preferably supplied via a PLL circuit 15 to the transmitter 16, the receiver 17, and, according to the embodiment shown by way of example in FIG. 1, to an output 50 of user 10. At this point it is noted that user 20 has at least one outgoing interface and a spread spectrum clock which are at least similar to the outgoing interface and the spread spectrum clock of user 10. Subscriber 30 has at least one incoming interface which is at least similar to the incoming interface of user 10.

Each user may be controlled and monitored by a programmable control device (not illustrated). Each user may have a data processing unit in a manner known as such. Such a data processing unit 11 is implemented in user 10. This data processing unit is connected to transmitters 12 and 16 and to receivers 14 and 17.

Transmitter 16 for user 10 transmits data DO1, synchronously with the spread spectrum clock signal SST1, to user 30 via data line 60. Data DI1 arriving from user 30 are received at receiver 17 for user 10 via data line 70. The local spread spectrum clock signal SST1 is transmitted to user 30 via clock line 50. It is noted that data DI1 have been coded by user 30 by means of the local spread spectrum clock signal SST1 of user 10, as explained in conjunction with the incoming interface for user 10.

It is noted that the spread spectrum clock signal SST1 does not have to be transmitted from user 10 to user 30 via clock line 50. It is also possible for user 30, the same as the other users 10 and 20, to contain a clock recovery circuit (not illustrated) which recovers the spread spectrum clock signal SST1 from data signal DO1 which is received via data line 60 and modified with respect to its spectrum.

The operation of the field bus system is explained in greater detail below in conjunction with FIGS. 1 and 2.

It is assumed that user 10 intends to transmit data DO1 to user 30. It is further assumed that the spread spectrum clock 40 provides a spread spectrum clock signal SST1 which is supplied to the transmitter 16 and to the receiver 17 via PLL circuit 15 and to user 30 via clock line 50. The data to be transmitted are supplied by the data processing unit 11, for example, to the coder for the transmitter 16. In response to the spread spectrum clock signal SST1 the coder generates a correspondingly spectrally modified data signal which is transmitted to user 30 via data line 60.

Figure 2:
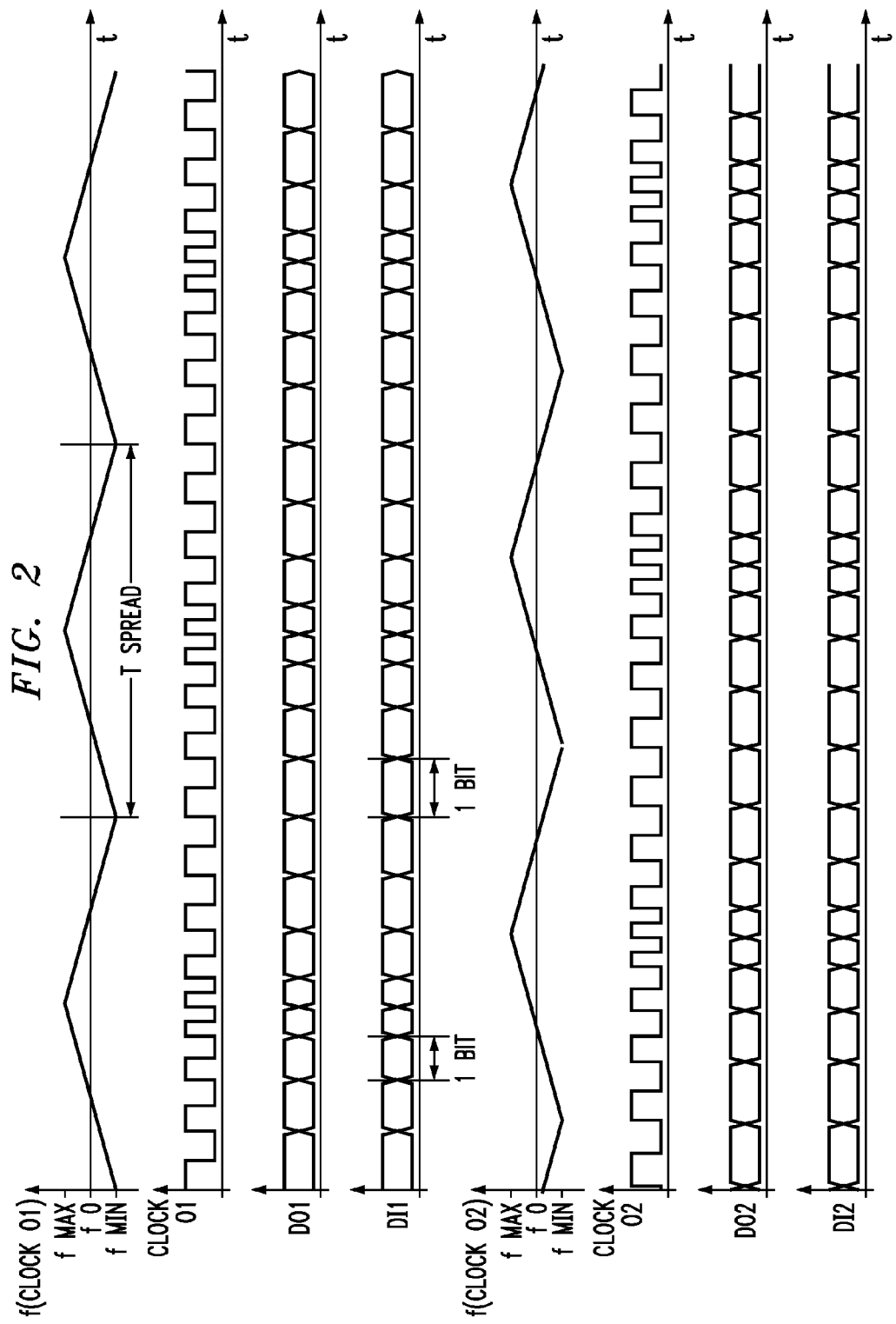
FIG. 2 shows signal forms for various switching points in the sending and return of signals of the ring-shaped field bus system.

FIG. 2 shows an example of a modulation function f(clock O1) which is used to modify the frequency of a clock signal in the spread spectrum clock 40 in order to generate the spread spectrum clock signal SST1 (denoted by reference character O1 in FIG. 2). The variation of the modulation function over time is illustrated as a rising and falling straight line over three spread periods T, with the frequency deviation plotted on the ordinate axis. For low values of the modulation function f the frequency of the spread spectrum clock signal O1 is low, and for high values of the modulation function f the clock frequency is higher. The relationships are depicted in an exaggerated manner in the drawing for purposes of illustration. The maximum frequency fmax or the minimum frequency fmin deviate only slightly from the mean frequency f0, for example by only approximately 0.2% greater or less than the mean frequency f0. This change in frequency results in different pulse lengths in the spread spectrum clock signal O1, and, correspondingly, different bit lengths in signals DO1 and DI1. It is noted that data signal DO1 corresponds to the output signal of transmitter 16, whereas data signal DI1 shown in FIG. 2 corresponds to the input signal of receiver 17.

To simplify the illustration, the spread spectrum clock signal O1 matches data signal DO1 in a 1:1 ratio. In practice, however, more rapid conversion is preferred. For example, transformation of a 50-MHz spread spectrum clock signal O1 to a 200-MHz data signal DO1 is achieved in practice. In addition, the period T of the modulation signal is illustrated in a greatly exaggerated manner. In one practical example the period T is 10 µs at a frequency of f0=100 MHz.

Once again the case is assumed for which user 10 receives data DO2 from user 20 via data line 66. At the same time, user 10 also receives the specific spread spectrum clock signal of user 20 via clock line 55 by means of which data signal DO2 has been spectrally modified. FIG. 2 also shows this spread spectrum clock signal O2 as well as the associated modulation function f(clock O2), likewise with rising and falling function values, but in a different phase position with respect to clock period T. The phase position of the specific spread spectrum clock signals O1 and O2 of users 10 and 20 may thus be differentiated. It is noted that the relative phase position of the local spread spectrum clock signals is random and may change; i.e., the clock signals are independently generated. As a result, data signal DO2 is also spectrally modified in a different way than for data signal DO1. However, since user 10 has received the spread spectrum clock signal O2 from user 20, the received data signal DO2 may be correctly decoded in the decoder of receiver 14 and sent to the data processing circuit 11. It is noted that data signal DO2 corresponds to the input signal of receiver 14, whereas data signal DI2 shown in FIG. 2 corresponds to the output signal of transmitter 12.

To enable transmission of data DI2 to user 20 via data line 77, user 10 uses the spread spectrum clock signal O2 received from user 20 in the coder for transmitter 12. Of course, user 20 knows its own specific spread spectrum clock signal and is therefore able to decode the received data signal DI2.

User 30 may transmit data to user 10 in a similar manner. For this purpose a spectrally modified data signal DI1 is generated in a coder of user 30 in response to the specific spread spectrum clock signal of user 10. The decoder for receiver 17 is then able to correctly decode the received, spectrally modified data signal DI1.

All variants have the advantage that interfering emissions are greatly reduced by use of a specific spread spectrum clock signal in each user, with economical generation of the spread spectrum clock signals.

What is claimed is:

1. A field bus system comprising:
   a plurality of users (10, 20, 30), including a local user (10), a first adjacent user (30), and a second adjacent user (20), each having a first clocked transmitter (16) and a first clocked receiver (17) for transmitting data signals to the first adjacent user (30) or for receiving data signals from the first adjacent user (30);
   the local user (10) having a second clocked transmitter (12) and a second clocked receiver (14) for transmitting data signals (DI2) to the second adjacent user (20) and for receiving data signals (DO2) from the second adjacent user (20); and
   each specific spread spectrum clock (40) being assigned to and specific for each user (10, 20, 30) for providing a user-specific spread spectrum clock signal which is sent to the transmitter (16) and the receiver (17) of the particular user (10, 20, 30) to allow data signals (DO1, DI1, DO2, DI2) to be transmitted and received synchronously with the specific spread spectrum clock signal, the local user (10) transmitting its specific spread spectrum clock signal (SST1) to the first adjacent user (30), and this spread spectrum clock signal (SST1) being used by the first adjacent user (30) for receiving and for transmitting to the local user (10)), the specific spread spectrum clock signal of the second adjacent user (20) being sent to the second transmitter (12) and to the second receiver (14) of the local user (10).

2. The field bus system according to claim 1, wherein the spread spectrum clock signal (SST1) of the local user (10) is transmitted to the first adjacent user (30) via a separate clock line (50) or by means of the transmitted data signal (DO1).

3. The field bus system according to claim 1, wherein said plurality of users is arranged in a chain with each field bus connecting respective adjoining users (10, 20, 30).

4. The field bus system according to claim 1, wherein the local user (10) has an interface (18) for receiving the specific spread spectrum clock signal of the second user (20) via a separate clock line (55).

5. The field bus system according to claim 1, wherein the local user (10) has a clock recovery circuit for recovering the specific spectrum clock signal of the second user (10) from the data signal (DO2) coming from the second user (20).

6. The field bus system according to claim 1, wherein each of the first and second clocked transmitter (12, 16) of each user (10, 20, 30) has one coder, and each of the first and second clocked receiver (14, 17) of each user (10, 20, 30) has one decoder.

7. The field bus system according to claim 1, wherein the spread spectrum clock (40) of the local user (10) provides a spread spectrum clock signal (SST1) whose frequency varies within a spread period (T), so that the frequency of the data signal (DO1) that is to be transmitted changes in accordance with this local spread spectrum clock signal (SST1).

8. The field bus system according to claim 1, wherein each user (10, 20, 30) has at least one phase control circuit (13, 15) that adjusts the phase position of the data signals (DO1, DI1; DO2, DI2) to the phase position of the respective spread spectrum clock signal.

9. The field bus system according to claim 1, wherein each user (10, 20, 30) has a programmable control device and/or a data processing unit (11).

10. A field bus device for being used in a field bus system as a local field bus device (10) comprising:
    a first clocked transmitter (16) and a first clocked receiver (17) for transmitting data signals to a first adjacent field bus device (30) or for receiving data signals from the first adjacent field bus device (30);
    a second clocked transmitter (12) and a second clocked receiver (14) for transmitting data signals to a second adjacent field bus device (20) or for receiving data signals from the second adjacent field bus device (20); and
    a spread spectrum clock (40) for providing a local spread spectrum clock signal (SST1) which is specific for being sent to the first clocked transmitter (16) and the first clocked receiver (17) of the local field bus device (10) to allow data signals (DO1, DI1) to be transmitted to the first adjacent field bus device (30) and to be received synchronously with the local spread spectrum clock signal, the local field bus device (10) transmitting its local spread spectrum clock signal (SST1) to the first adjacent field bus device (30), and this spread spectrum clock signal (SST1) being used by the first adjacent field bus device (30) for receiving and for transmitting to the local field bus device (10), whereas the spread spectrum clock signal from the second adjacent field bus device (20) is used by the local field bus device (10) to transmit to, and to receive from, the second adjacent field bus device (20).

* * * * *